United States Patent Office 2,759,901
Patented Aug. 21, 1956

2,759,901

PARTIAL ESTERS OF EPOXIDE RESINS

Sylvan Owen Greenlee, Racine, Wis., assignor to Devoe & Raynolds Company, Inc., Louisville, Ky., a corporation of New York No Drawing. Application September 19, 1952, Serial No. 310,560

6 Claims. (Cl. 260—18)

This invention relates to new partial esters of epoxide resins and is a continuation in part of my prior application Ser. No. 632,594, filed December 3, 1945, now U. S. Patent No. 2,653,141.

The new synthetic esters are short oil length epoxide resin esters which are of value for use in coating and film forming compositions, for use as varnishes or in making paints, films, molding compositions, etc.

The new synthetic esters of epoxide resins are made by partial and limited esterification of the epoxide resins, and particularly by partial esterification of the epoxide groups of the resins while leaving part of the epoxide groups of the resins unesterified.

The present invention includes partial esters of epoxide resins which are mainly monoesters of diepoxides, so that the resulting esters are epoxide esters in the sense that they include both an epoxide and an ester group.

The invention also includes partial esters such as described in said prior application Ser. No. 632,594, and other partial esters of epoxide resins compounded with aliphatic polyepoxides or with epoxide resins to form compositions which, on heating, can react through epoxide groups of the resin and hydroxyl groups of the partial esters.

The invention also includes partial esters such as described in said prior application, where the esterification is so limited that the epoxide groups of the resins are only partly esterified and so that the partially esterified product contains both epoxide and ester groups, such that the products can react through their epoxide groups, e. g., with hydroxyl groups.

The invention also includes partial esters of epoxide resins containing a large number of alcoholic hydroxyl groups in which the epoxide groups may all be esterified, but in which the over-all esterification represents less than 10% of the amount of ester groups required for complete esterification.

The invention also includes epoxide esters and mixtures of epoxide esters and epoxide resins in which the amount of monocarboxylic acid used for esterification is less than 10% of that which would effect complete esterification, and in which the esters are monoesters or mainly monoesters or mixtures of monoesters and unesterified resin.

The epoxide resins which are subjected to limited esterification to produce the new esters are resins containing terminal epoxide or glycidyl groups such as diglycidyl ethers and diglycidyl polyethers of dihydric phenols and which may contain one or a number of intermediate alcoholic hydroxyl groups. Such resins can be produced from dihydric phenols by reaction with dichlorhydrin and caustic alkali, or by reaction of dihydric phenols with an excess of diepoxides to produce polyether derivatibes of dihydric phenols having terminal epoxide groups and also having intermediate alcoholic hydroxyl groups. Such epoxide resins may be monomeric products, but in general are polymeric products. The epoxide resins produced by reacting a dihydric phenol with epichlorhydrin in excess and caustic alkali are in general of a liquid or solid resinous character and are glycidyl ethers or glycidyl polyethers of the dihydric phenols, and a considerable part are diglycidyl ethers. Various dihydric phenols can be used in preparing these glycidyl ethers, including mononuclear phenols such as resorcinol, etc., or polynuclear phenols such as bisphenol (p,p'dihydroxydiphenyl-dimethyl methane) and other dihydroxydiaryldialkyl methanes, 1,5-dihydroxy naphthalene, etc.

The production of epoxide resins suitable for use in making the esters is described in U. S. Patents 2,582,985, 2,615,007 and 2,615,008.

The epoxide resins which are to be subjected to limited esterification also include the reaction products of dihydric phenols with diepoxides such as diglycide ether, butadiene diepoxide, and the diepoxides and polyepoxides resulting from the reaction of polyhydric alcohols such as glycerol, etc. with epichlorhydrin to produce polychlorhydrin ethers of the polyhydric alcohol and by dehydrohalogenation of the polychlorhydrin ethers, e. g., with sodium aluminate, as described in U. S. Patents 2,538,072 and 2,581,464, such epoxide resins also containing alternating aromatic and aliphatic nuclei or groups united through ether oxygen.

The epoxide content or epoxide equivalent of the epoxide resins is determined for practical purposes by determining the equivalent weight of the composition per epoxide group. The method used for determining the epoxide content is by heating 1 gram sample of the epoxide resin with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering that 1 HCl is equivalent to 1 epoxide group.

In making the new partial esters, containing both epoxide and ester groups, from the epoxide resins, they are subjected to limited esterification with monocarboxylic acids, and the amount of monocarboxylic acid used for esterification is less than that corresponding to the epoxide groups of the resin, in order that the partially esterified resins may be epoxide resin esters. Thus, with a diepoxide resin or a diglycide or polymerized diglycide ether of a dihydric phenol, the use of one mol of monocarboxylic acid for esterification per mol of resin will, in general, form a monoester by reaction with one terminal epoxide group, while leaving the other terminal epoxide group unreacted, thus giving what migh be considered a monoepoxy resin monoester.

While both the alcoholic hydroxyl groups and the epoxide groups of the resins can be esterified, the reactions which take place are different and the epoxide groups tend to react preferentially and at a lower temperature. The reaction of a monocarboxylic acid with an epoxide group is a direct addition reaction; while the esterification of an alcoholic hydroxyl group by a fatty acid is a dehydration reaction, with elimination of water, and in general requires a higher temperature than the reaction of the fatty acid with an epoxide group. Accordingly, in carrying out the partial and limited esterification to produce epoxy resin esters, the conditions of esterification are those which favor the reaction of the acids with the epoxy groups, and the amount of acid is less than that corresponding to the epoxy groups, so that only part of the epoxy groups react to form esters, leaving the remainder of the epoxy groups largely unreacted and leaving the alcoholic hydroxyl groups largely or entirely unesterified.

The monocarboxylic acids used for partial or limited esterification of the epoxide resins include both unsaturated and saturated fatty acids and other monobasic acids. When unsaturated acids, such as drying oil acids, are used for partial and limited esterification, the short oil esters formed may have valuable drying properties. When saturated acids such as stearic acid, or non-drying acids, are used for limited esterification, the products do not have drying properties but have reactive properties through their epoxide and hydroxyl groups. A limited esterification of the epoxide resins, to form products containing both epoxide and ester groups, gives modified epoxide resins which form films that are more flexible than the films formed from the unesterified epoxide resins; and the modified resins are also more soluble in solvents than the unesterified resins, and their films exhibit less crawling tendency. The products are also characterized by the outstanding adhesion apparently due to the unesterified hydroxyl groups. The products also give films with good chemical resistance.

An advantageous method of making the partial and limited esters, which are mainly monoesters of the epoxide resins, is by subjecting a larger amount of epoxide resin to esterification than actually takes part in the esterification reaction, so that a part only of the epoxide resin molecules are esterified and the remainder are unesterified. This results in the production of a mixture of unesterified epoxide resin and epoxide-containing esterified resin. Thus, if 2 mols of a diepoxide resin are esterified with one mol of an unsaturated drying oil acid, the resulting esterified product will approximate in composition a mixture of one mol of unesterified epoxide resin, and of one mol of epoxide resin having one unreacted epoxide group and with an ester group reacted with the other epoxide group to form a monoester.

Mixtures of the epoxide resins and monoesters of epoxide resins can also be obtained by subjecting part of the resin to partial and limited esterification to form mainly a monoepoxide monoester of all or practically all of the resin and blending this product with further amounts of the same or other epoxide resins.

The partial esters which have both an epoxide and an ester group can react through their epoxide group with hydroxyl or other groups. And when admixed with unesterified epoxide resin, both the epoxide groups of the esters and those of the unesterified resins can undergo such reaction.

The polymeric epoxide resins will vary in their content of esterifiable hydroxyl groups and may contain a considerable number of esterifiable hydroxyl groups in addition to their terminal epoxide groups. While, from the standpoint of complete esterification, one epoxide group can be considered equivalent to two hydroxyl groups, yet, from the standpoint of partial and limited esterification, the epoxide groups are not the equivalent of the hydroxyl groups because of the different nature of their reaction with the monobasic fatty acids to form esters. On limited esterification, under conditions favoring the reaction of the epoxide groups with the monobasic fatty acids, the reaction tends to produce first a monoester. Some diester may be produced from a diepoxide, before all of the diepoxide is converted into a monoester. With increase in the amount of carboxylic acid, the esterification can be carried to the stage of producing an ester in which all of the epoxide groups have reacted with the fatty acid and without any material reaction with hydroxyl groups of the resin. On further esterification with an increased amount of fatty acids, and at temperatures promoting esterification of the hydroxyl groups, a further increase in esterification can be effected. When all of the epoxide groups of the resin have reacted, the ester will no longer be an epoxide resin ester in the sense of containing reactive epoxide groups; but they can advantageously be used in admixture with epoxide resins or aliphatic diepoxides, since the free hydroxyl groups of the esters readily react with the epoxide groups of the epoxide resins or diepoxides, particularly in the presence of a suitable catalyst such as an alkaline catalyst.

Where the total number of esterifiable groups, considered as hydroxyl groups, and including an epoxide group as equivalent to two hydroxyls, is 10 or less, the conversion of a diepoxide resin to a monoepoxide resin monoester will represent a partial esterification of 10% or more. Where the epoxide resins contain more than 10 esterifiable groups, considered as hydroxyls, and with epoxide equal to two hydroxyls, e. g., 15 or 18 or 20 or 30 esterifiable hydroxyls (including epoxide equivalents) the amount of acid required to form the monoester will be less than 10% and may be much less than 10%. And even where all of the epoxide groups have reacted to form esters, the resulting partial ester may still represent less than 10% esterification.

The epoxide esters will, in general, be both epoxide esters and hydroxy esters, because they will contain hydroxyl groups as well as an epoxide group. And these partial esters, because of their free hydroxyl groups, are capable of further reaction, through these free hydroxyl groups, with e. g. epoxide groups or polyepoxy compounds or complex epoxides such as described in my patents and applications above referred to. When the partial esters contain both epoxide and hydroxyl groups, the epoxide groups can also react with hydroxyl groups of other molecules. The new partial esters may thus be compounded with the complex epoxides or polyepoxides of said patents and applications above referred to, to form new reaction products in which the epoxide groups combine with hydroxyl groups to form complex reaction products. The reaction between epoxide and hydroxyl groups takes place without formation of byproducts and by direct addition to form ether linkages.

By using the new partial esters with the complex epoxy compositions such as those of said patents and applications, in proportions to bring about sufficient reaction of epoxide groups with a large part of the free hydroxyl groups of the partial esters, e. g., in equivalent proportions, or with an excess of the epoxide, and on heating the resulting mixture with a small amount of a catalyst such as an alkali phenoxide, reaction products can be obtained which are infusible. The reaction mixtures which give such infusible reaction products are available for use in making molding mixtures, films, and for other purposes.

Where the partial esters are hydroxy esters or are free from epoxide groups, they can also advantageously be compounded with varying amounts of simple polyepoxides such as diepoxy butane and diglycide ether, and the resulting mixture can be heated, particularly with a small amount of catalyst such as boron trifluoride or an alkali phenoxide, to bring about reaction and crosslinking, the epoxide groups and hydroxyl groups combining by direct addition to form ether linkages.

Other coupling agents such as polybasic acids, polyisocyanates and aldehydes can also be admixed with the new compositions and reacted therewith, through the free hydroxyl groups, to give complex reaction products.

These other reactions to which the new hydroxy esters can be subjected may be combined with the use of the esters in making coating compositions. Thus quick drying coating compositions can be made by dissolving the new hydroxy esters in a volatile solvent together with other reagents which will react therewith, such as epoxy compositions, etc., and the resulting film, after evaporation of the solvent, can then be subjected to a high temperature to effect the desired reaction and final hardening of the composition.

The new partial esters of the epoxide resins, which are largely or mainly monoesters with only part of the epoxide groups esterified, are unique and distinctive in that the intermediate hydroxyl groups remain largely or completely unesterified. The epoxide groups at the ends of the molecules appear to react much more readily with the free carboxylic acids to form esters than do the intermediate alcoholic hydroxyl groups. The reaction of the terminal epoxide groups with the monobasic acids is a direct addition reaction which does not require the driving off of water of esterification as does the esterification of an alcoholic hydroxyl group with a carboxylic acid. The partial and limited esterification of a diepoxide resin, therefore, with incomplete reaction of the epoxide groups, provides a method of producing epoxide resin esters of a unique and distinctive character. To a considerable extent, these partial esters retain the properties of the epoxide resins because of the presence of the epoxide groups and their capacity for reaction. But the properties of the epoxide resin are modified by the limited esterification to impart, e. g., greater solubility and other improved properties. The intermediate hydroxyl groups of the partial esters are capable of reaction, e. g., with epoxide groups of other compounds or molecules or with other cross-linking reagents which will react with hydroxide groups.

The new partial esters form films having outstanding flexibility and adhesion. They give hard products and products with good flow or leveling properties and good pigment wetting characteristics. They also have reasonable solubility in solvents, particularly in ester solvents. The new esters give films characterized not only by outstanding adhesiveness, but by chemical resistance. Compositions made of the new esters are of value in coating compositions, particularly as primers or for use in primers.

In some cases, the new esters are desirable coating compositions without further admixture except for the addition of a small amount of a hardening agent or catalyst, particularly where the partial esters are also admixed with unesterified epoxide resins. The new partial esters can also advantageously be admixed with other esters or resins, e. g., they may be admixed with urea aldehyde resins or melamine aldehyde resins or phenol aldehyde resins, etc., making coating compositions.

The invention will be further illustrated by the following examples, but it will be understood that the invention is not limited thereto. In many of the examples, the partial and limited esterification is carried out with an excess of resin such that only part of the resin is subjected to esterification and so that the resulting partially esterified product is a mixture of unesterified resin and esterified resin.

The resins referred to in the examples and which are subjected to limited esterification are epoxide resins such as result from the reaction of bisphenol with epichlorhydrin in the presence of caustic alkali, and vary from liquid resins such as commercial diglycide ether of bisphenol to highly polymeric products such as are produced by reacting lower melting point resins with added bisphenol to form high molecular weight resins containing up to e. g. around 30 hydroxyl groups per molecule, including epoxide equivalents.

In carrying out the process referred to in the following examples, the mixture of resin and fatty acid, with added solvent when used, was heated to the temperatures and for the times indicated, with agitation of the mixture during the heating, and with refluxing where a solvent was used. The parts are by weight.

In referring to the viscosity of the product, the viscosity of the Gardner-Holdt scale is referred to. The colors indicated are colors by the Gardner 1933 standard.

The urea-formaldehyde-catalyst composition referred to in the examples and used for compounding with the partial esters was a butylated urea formaldehyde resin, used in the form of a 50% solution in a solvent made up of 60% butanol and 40% xylol, to which was added as a catalyst 0.3%, based on the resin solids, of para-toluene sulfonic acid monohydrates. The amount of the urea-formaldehyde-catalyst composition referred to in the examples is based on the solids content of the composition in comparison with the solids content of the partial ester solution with which it is used, that is, the ratios given are based on the non-volatile portions of the resins and esters.

Example 1

The resin used was produced from bisphenol and epichlorhydrin, had a melting point of 12° C., a weight per epoxide of 202.3 and an equivalent esterification weight of approximately 100, and was largely a diglycide ether of bisphenol.

2,841 parts of the resin was heated with 159 parts of soya fatty acids to 350° F. and held at this temperature for about 4 minutes. The reaction mixture was then cooled and thinned to 80% solids in hi-flash naphtha. The reaction product had an acid value of 0.17, a weight per epoxide of 235, a weight per gallon of 9.04, a viscosity of K and color of 9–10.

In this example, the amount of fatty acid used for esterification was a small fraction of that required for esterifying all of the resin to form a monoester, so that the resulting reaction product was made up mainly of unesterified resin with a limited amount of esterified resin. Assuming all of the acid reacted to form a monoester, the reaction mixture would contain around 92% of the resin unesterified and around 8% of the resin esterified to the monoester, or about 13% of monoester.

To the solution formed by thinning the reaction product, there was added 6% diethylene triamine and a film of 3 mil thickness was drawn on glass and baked for 15 minutes at 150° C. The resulting film showed flexibility, good adhesion, toughness and moderate hardness.

Example 2

2626.2 parts of the same resin referred to in Example 1 and 373.8 parts of stearic acid were heated at 350–360° F. for 30 minutes. The reaction mixture was cooled and thinned to 80% solids with hi-flash naphtha. The reaction product had a weight per epoxide of 290, an acid value of 0.17, a weight per gallon of 8.85, a viscosity of I and color of 10–11.

In this example, the amount of stearic acid used was sufficient to convert only around 20% of the resin to the monoester so that the resulting reaction product, assuming the monoester formed, would contain approximately 70% free resin and 30% monoester.

When a 3 mil film of the solution of the reaction product, containing 6% diethylene triamine, was drawn on glass and baked 15 minutes at 150° C., the film was moderately soft and flexible.

When such a film was allowed to stand in the air for 65 hours a soft and flexible film was obtained.

Example 3

2798.1 parts of the same resin as in Example 1 and 201.9 parts of 2 ethyl hexoic acid were heated at 400–412° F. for 15 minutes. The reaction mixture was cooled and thinned to 60% solids with hi-flash naphtha. The reaction product had a weight per epoxide of 260, no acid value, a weight per gallon of 9.01, a viscosity of L and color of 8–9.

A 3 mil film with 6% diethylene triamine was drawn on glass and baked 15 minutes at 150° and a similar film was air dried for 65 hours, both films showed flexibility and moderate hardness.

In this example, the amount of acid used was sufficient to convert only around 20% of the resin to monoester, so that the resulting reaction product would be a mixture of about 75% unesterified resin and about 25% of ester, based on the monoester.

Example 4

2396.1 parts of the same resin as in Example 1 and 603.9 parts dehydrated castor fatty acids were heated at 350–400° F. with 150 parts of hi-flash naphtha for 37 minutes. The reaction mixture was cooled and thinned to 80% solids with hi-flash naphtha. The reaction product had a weight per epoxide of 340, no acid value, a weight per gallon of 8.80, a viscosity of J and a color of 9–10.

A 3 mil film with 6% diethylene triamine drawn on glass and baked 15 minutes at 150° C. showed flexibility, toughness and moderate hardness.

A similar film allowed to air dry 70 hours showed toughness, flexibility and softness.

The amount of fatty acid used for esterification in this example was somewhat more than one-third of that required for converting all of the resin into monoester, so that the reaction product was made up of approximately equal parts of unesterified epoxide resin, and esterified resin (assuming the monoester).

*Example 5*

The resin used was produced by the reaction of bisphenol and epichlorhydrin the presence of caustic alkali, had a melting point of 42° C., a weight per epoxide of 315, and an equivalent weight for esterification of approximately 105.

2858.4 parts of this resin and 141.6 parts of dehydrated castor fatty acids were heated at 400° F. for 10 minutes. The reaction mixture was cooled and thinned to 70% solids with hi-flash naphtha. The reaction product had a weight per epoxide of 420, an acid value of 0.19, a weight per gallon of 8.86, a viscosity of X–Y and color of 8.

A 3 mil film containing 6% diethylene triamine drawn on glass and baked 15 minutes at 150° C. was hard and flexible. A similar film allowed to air dry 68 hours was moderately soft and flexible. A 3 mil film containing 20% of the urea-formaldehyde-catalyst composition above referred to, drawn on glass and baked 15 minutes at 150° C., gave a soft film.

The amount of acid used in this example was sufficient to convert only about 10% of the resin to ester leaving the reaction product made up largely of unesterified resin, admixed with around 15% of ester.

*Example 6*

2646 parts of the same resin as in Example 5 and 354 parts linseed fatty acids were heated at 400° F. for 10 minutes. The reaction mixture was cooled and thinned to 70% solids with hi-flash naphtha. The reaction product had a weight per epoxide of 490, no acid value, a weight per gallon of 8.75, a viscosity of W and color of 8.

A 3 mil film with 6% diethylene triamine drawn on glass and baked 15 minutes at 150° C. was hard and flexible. A similar film allowed to air dry for 68 hours was moderately soft and flexible.

A series of 3 mil films with 10%, 20%, 40% and 60% of the urea-formaldehyde-catalyst above referred to were drawn on glass and baked 15 minutes at 150° C. The 10% film was tacky; the 20% film was soft and tack free; the 40% film was moderately hard, tough and flexible; and the 60% film was hard and brittle.

The amount of linseed acids used in this example was sufficient to convert only about 25% of the resin to ester, leaving the reaction product a mixture of about one-third ester and two-thirds free resin.

*Example 7*

2549.7 parts of the same resin as in Example 5 and 450.3 parts of coconut fatty acids were heated at 400° F. for 5 minutes. The reaction mixture was cooled and thinned to 70% solids with hi-flash naphtha. The reaction product had a weight per epoxide of 650, no acid value, a weight per gallon of 8.80, a viscosity of $Z_1$–$Z_2$, and color of 7–8.

A 3 mil film with 20% of the urea-formaldehyde-catalyst composition above referred to, drawn on glass and baked 15 minutes at 150° C., was slightly tacky. A 3 mil film with 6% diethylenetriamine drawn on glass and baked 15 minutes at 150° C. was moderately hard and flexible.

A 3 mil film with 6% diethylene triamine drawn on glass and allowed to air dry 68 hours was moderately soft and flexible.

The amount of acid used was sufficient to esterify about half of the resin to form the monoester.

*Example 8*

The epoxide resin used was produced by the reaction of bisphenol and epichlorhydrin in the presence of caustic alkali, had a melting point of 98° C., a weight per epoxide of 940, and an equivalent weight of approximately 175.

2930.4 parts of this resin, 69.6 parts of coconut fatty acids and 150 parts of hi-flash naphtha were heated at 320–400° F. for 1 hour and 10 minutes. The reaction mixture was cooled and thinned to 50% solids with 50% hi-flash naphtha and 50% Cellosolve (2-ethoxy-ethanol) acetate. The reaction product had a weight per epoxide of 1250, an acid value of 0.27, a weight per gallon of 8.63, a viscosity of T, and color of 6–7.

3 mil films with and without 0.01% cobalt drier on glass and baked 15 minutes at 150° C. were moderately hard and brittle. A 3 mil film with 20% of the urea-formaldehyde-catalyst composition above referred to, drawn on glass and baked 15 minutes at 150° C. was moderately hard, tough, and flexible. A 3 mil film with 6% diethylene triamine drawn on glass and baked 15 minutes at 150° C. was hard and flexible. A similar film allowed to air dry 67 hours was soft and flexible.

The amount of coconut fatty acids used in this example were only sufficient to esterify about one-sixth of the resin to form the monoester.

*Example 9*

76 parts of the same resin as in Example 8 and 4 parts of coconut fatty acids were heated at 450° F. for 1 hour and 10 minutes. The reaction mixture was cooled and thinned to 65% solids with 75% toluene and 25% methyl ethyl ketone. The reaction product had a weight per gallon of 8.56, no acid value, a viscosity of Y–Z, and color of 11.

The amount of acid used in this example was sufficient to esterify only about one-third of the resin to form the monoester so that the resulting mixture would contain about equal proportions of resin and ester.

*Example 10*

2777.7 parts of the same resin as in Example 8, 222.3 parts of dehydrated castor fatty acids and 150 parts of hi-flash naphtha were heated at 335–400° F. for 40 minutes.

The reaction mixture was cooled and thinned to 49% solids with 65.35% hi-flash naphtha and 34.65% Cellosolve acetate. The reaction product had a weight per epoxide of 1600, an acid value of 0.27, a weight per gallon of 8.47, a viscosity of R–S, and color of 6–7.

3 mil films with and without 0.01% cobalt drier drawn on glass and baked 15 minutes at 150° C. were moderately hard and brittle. A 3 mil film without drier drawn on glass and allowed to air dry 100 hours was moderately soft. A similar film allowed to air dry 91 hours was moderately hard and flexible.

The amount of fatty acids used in this example was sufficient to esterify around 40% of the resin to form a monoester, so that the resulting reaction mixture contains a somewhat larger amount of ester than of free resin.

*Example 11*

2838 parts of the same resin as in Example 8, 162 parts of lauric acid and 150 parts of hi-flash naphtha were heated at 342–400° F. for 25 minutes.

The reaction mixture was cooled and thinned to 50% solids with 46.08% Cellosolve acetate and 53.92% hi-flash naphtha. The reaction product had a weight per epoxide of 1585, an acid value of 0.27, a weight per gallon of 8.57, a viscosity of Q-R, and color of 6-7.

3 mil films with and without 0.01% cobalt drier drawn on glass and baked 15 minutes at 150° C. were moderately hard and brittle. A 3 mil film with 20% of the urea-formaldehyde-catalyst composition above referred to, drawn on glass and baked 15 minutes at 150° C. was moderately hard, tough and flexible. A 3 mil film with 6% diethylene triamine drawn on glass and baked 15 minutes at 150° C. was moderately hard and flexible. A similar film allowed to air dry 70 hours was tack free and very soft.

The amount of lauric acid used in this example was similar to the amount of dehydrated castor fatty acids used in the preceding example so that the reaction mixture would be esterified only to the extent of around 40%.

*Example 12*

2622.3 parts of the same resin as in Example 8, 377.7 parts of soya fatty acids and 150 parts of hi-flash naphtha were heated at 400-460° F. for 1 hour.

The reaction mixture was cooled and thinned to 50% solids with 66⅔% hi-flash naphtha and 33⅓ Cellosolve acetate. The reaction product had a weight per epoxide of 2770, an acid value of 0.54, a weight per gallon of 8.39, a viscosity of U and color of 6.

3 mil films with and without 0.01% cobalt drier drawn on glass and baked 15 minutes at 150° C. were moderately hard and brittle. A 3 mil film without drier drawn on glass and allowed to air dry 100 hours was soft. A 3 mil film with 0.01 cobalt drier drawn on glass and allowed to air dry 91 hours was moderately hard.

A series of 3 mil films with 10%, 20%, 40% and 60% of the urea-formaldehyde-catalyst composition above referred to were drawn on glass and baked 15 minutes at 150° C. The 10% film was moderately hard and brittle, the 20% film was moderately hard, flexible and tough and the 40% and 60% films were moderately hard and brittle.

A 3 mil film with 6% diethylene triamine drawn on glass and baked 15 minutes at 150° C. were moderately hard and brittle. A similar film allowed to air dry was soft and brittle.

In this example the amount of soya acids was sufficient to esterify the greater portion of the resin to form the monoester, e. g., to the extent of around 70% or somewhat more, and giving a reaction product made up mainly of ester with a smaller per cent of free resin.

*Example 13*

The resin used was a higher melting point resin than that referred to in Example 8, and was made by heating the resin of Example 8 with about 5% of bisphenol. The resulting higher melting point resin and a melting point of about 128° C., a weight per epoxide of around 1728, and an equivalent weight of approximately 190.

2955 parts of this resin with 45 parts of 2 ethyl hexoic acid and 150 parts of hi-flash naphtha were heated at 458-460° F. for 20 minutes.

The reaction mixture was cooled and thinned to 50% solids with 50% hi-flash naphtha and 50% Cellosolve acetate. The reaction product had a weight per epoxide of 3000, an acid value of 0.26, a weight per gallon of 8.64, a viscosity of $Z_2$, and color of 8.

3 mil films with and without 0.01% cobalt drier and with 20% of the urea-formaldehyde-catalyst composition above referred to drawn on glass and baked 15 minutes at 150° C. were moderately hard, tough and flexible. A 3 mil film with 6% diethylene triamine drawn on glass and baked 15 minutes at 150° C. was hard and flexible. A similar film allowed to air dry 67 hours was tack free and soft.

In this example, the amount of acid used was only about one-third, or somewhat more, of that sufficient to convert the resin to the monoester, leaving around two-thirds of the resin or somewhat less unesterified.

*Example 14*

88 parts of the same resin as in Example 13 and 2.7 parts of linseed fatty acids were heated at 494-500° F. for one-half hour. The reaction mixture was cooled and thinned to 40.88% solids with 50% xylene and 50% Cellosolve acetate. The reaction product had an acid value of 0.23, a weight per gallon of 8.48, a viscosity of R-S, and color of 9.

In this example, the extent of the esterification was similar to that of the preceding example.

*Example 15*

667 parts of the same resin as in Example 13 with 35.1 parts linseed fatty acids were heated at 493-500° F. for 18 minutes. The reaction mixture was cooled and thinned to 48.39% solids with 33⅓% Cellosolve acetate, 33⅓% secondary butyl alcohol and 33⅓% xylene. The reaction product had an acid value of 0.6, a weight per gallon of 8.60, a viscosity of Y-Z, and color of 9-10.

The amount of acid used in this example for esterification was sufficient to convert about two-thirds of the resin to the monoester, but insufficient to esterify all of the epoxide groups.

*Example 16*

2859 parts of the same resin as in Example 13 with 150.6 parts of dehydrated castor fatty acids and 300 parts of hi-flash naphtha were heated at 410° F. for 15 minutes. The reaction mixture was cooled and thinned to 50.35% solids with 50% Cellosolve acetate and 50% hi-flash naphtha. The reaction product had an acid value of 0.17, a weight per gallon of 8.65, a viscosity of $Z_1$, and color of 8-9.

The amount of acid used in this example, and extent of the esterification, were similar to those of the preceding example.

*Example 17*

2794.2 parts of the same resin as in Example 13 with 205.8 parts of soya fatty acids and 150 parts of hi-flash naphtha were heated at 459-460° F. for 15 minutes. The reaction mixture was cooled and thinned to 50% solids with 50% hi-flash naphtha, and 50% Cellosolve acetate. The reaction product had a weight per epoxide of 5800, an acid value of 0.54, a weight per gallon of 8.56, a viscosity of $Z_1$-$Z_2$, and color of 8-9.

3 mil films with and without 0.01% cobalt drier drawn on glass and baked 15 minutes at 150° C. were moderately hard, tough and flexible. Similar films allowed to air dry 91-100 hours were moderately hard and flexible.

A series of 3 mil films with 10%, 20%, 40% and 60% of the urea-formaldehyde-catalyst composition above referred to were drawn on glass and baked 75 minutes at 150° C. The 10% and 20% films were hard, tough and flexible. The 40% and 60% films were hard and brittle.

The amount of soya acids used in this example was somewhat less than that sufficient to react with all of the epoxide groups and convert all of the resin into the monoester, the conversion being to the extent of around 90% of the resin.

*Example 18*

2847 parts of the same resin as in Example 13, with 153 parts coconut fatty acids and 150 parts hi-flash naphtha were heated at 460° F. for 20 minutes.

The reaction mixture was cooled and thinned to 50% solids with 50% hi-flash naphtha and 50% Cellosolve acetate. The reaction product had a weight per epoxide of 6100, no acid value, a viscosity of $Z_1$-$Z_2$, and color of 8-9.

3 mil films with and without 0.01% cobalt drier drawn on glass and baked 15 minutes at 150° C. were moderately hard and brittle. A 3 mil film with 20% of the urea-formaldehyde-catalyst composition above referred to drawn on glass and baked 15 minutes at 150° C. was hard, tough and flexible. A 3 mil film with 6% diethylene triamine drawn on glass and baked 15 minutes at 150° C. was moderately hard and flexible. A similar film allowed to air dry 70 hours was moderately soft and brittle.

The extent of the esterification in this case is similar to that of the preceding example.

*Example 19*

63 parts of the same resin as in Example 13 with 7 parts of linseed fatty acids were heated at 500° F. for one-half hour.

The reaction mixture was cooled and thinned to 50.66% solids with 33⅓% hi-flash naphtha, 33⅓% secondary butyl alcohol, and 33⅓% Cellosolve acetate. The reaction product had an acid value of 2.6, a weight per gallon of 8.43, a viscosity of $Z_1$, and color of 11.

The proportion of acid used in this example was more than sufficient to effect esterification of all of the resin to form the monoester, but insufficient to react with all of the epoxide groups, so that the resulting product appeared to be a mixture of monoester and diester of the epoxide resin.

*Example 20*

Soya fatty acids were used instead of the linseed fatty acids, according to Example 19, with heating at 500–508° F. for one-half hour.

The reaction mixture was thinned to 50% solids with 33⅓% secondary butyl alcohol, 33⅓% hi-flash naphtha and 33⅓% Cellosolve acetate. The reaction product had an acid value of 0.29, a weight per gallon of 8.37, a viscosity of $Z-Z_1$, and color of 12.

The product of the example had an extent of esterification similar to that of Example 19.

*Example 21*

The process of Example 20 was carried out with heating at 448–465° F. for 55 minutes instead of at the temperature and at the time stated in Example 20.

The reaction mixture was cooled and thinned to 50.3% solids with 33⅓% xylene, 33⅓% secondary butyl alcohol and 33⅓% Cellosolve acetate. The reaction product had an acid value of 0.79, a weight per gallon of 8.43, a viscosity of $Z_2$, and color of 10–11.

The extent of the esterification in this case was similar to that in the two preceding examples.

*Example 22*

2648 parts of the same resin as in Example 13, with 351 parts linseed fatty acids and 150 parts hi-flash naphtha were heated at 452–462° F. for 1¼ hours.

The reaction mixture was cooled and thinned to 45% solids with 33⅓% Cellosolve acetate and 66⅔% hi-flash naphtha. The reaction product had a weight per epoxide of 15,500, an acid value of 3, a weight per gallon of 8.41, a viscosity of W–X, and color of 9–10.

3 mil films with and without 0.01% cobalt drier and with 20% of the urea-formaldehyde-catalyst composition above referred to, drawn on glass and baked 15 minutes at 150° C. were moderately hard, tough and flexible. Similar films allowed to air dry 91–100 hours were moderately soft and flexible.

The amount of acid used in this example was more than sufficient to effect esterification of all of the resin to form the monoester, and gave a mixture which appears to be made up of mono and diesters.

*Example 23*

2643.9 parts of the same resin as in Example 13 with 356.1 parts of stearic acid and 150 parts of hi-flash naphtha were heated at 456–460° F. for 10 minutes.

The reaction mixture was cooled and thinned to 50% solids with 49.27% Cellosolve acetate and 50.73% hi-flash naphtha. The reaction product had no epoxide value, an acid value of 0.39, a weight per gallon of 8.48, a viscosity of $Z-Z_1$, and color of 8–9.

3 mil films with 20% of the urea-formaldehyde- catalyst composition above referred to, drawn on glass and baked 15 minutes at 150° C. were moderately hard, tough and flexible.

The esterification in this example was similar to that in the preceding example, but the product showed no epoxide value.

*Example 24*

2740.5 parts of the same resin as in Example 13 with 259.5 parts lauric acid and 150 parts hi-flash naphtha were heated at 452–460° F. for 1½ hours.

The reaction mixture was cooled and thinned to 50% solids with 44.88% Cellosolve acetate and 55.12% hi-flash naphtha. The reaction product had no epoxide value, an acid value of 0.54, a weight per gallon of 9.52, a viscosity of $Z_1$, and color of 8–9.

A 3 mil film with 20% of the urea-formaldehyde-catalyst composition above referred to drawn on glass and baked 15 minutes at 150° C. was moderately hard, tough and flexible.

The ester of this example was esterified to a similar extent as that of the preceding example and showed no epoxide value.

*Example 25*

The resin used in this example was made by heating the resin of Example 8 with about 7.75% of bisphenol to form a higher melting point resin having a melting point of about 146° C., a weight per epoxide of about 3436 and an equivalent weight of approximately 200.

2918 parts of this resin with 81 parts of linseed fatty acids and 350 parts of hi-flash naphtha were heated at 394° F. for 15 minutes.

The reaction mixture was cooled and thinned to 50% solids with 33⅓% hi-flash naphtha and 66⅔% Cellosolve acetate. The reaction product has a weight per epoxide of 9200, an acid value of 0.66, a weight per gallon of 8.64, a viscosity of $Z_4-Z_5$, and color of 9.

3 mil films with and without 0.01% cobalt drier and with 20% of the urea-formaldehyde-catalyst composition above referred to, drawn on glass and baked 15 minutes at 150° C. were moderately hard, tough and flexible. Similar films allowed to air dry 138 hours were moderately soft and flexible.

A series of 3 mil films with 10%, 20%, 40% and 60% of the urea-formaldehyde-catalyst composition above referred to were drawn on glass and baked 15 minutes at 150° C. The 10% and 20% films were moderately hard, tough and flexible. The 40% and 60% films were moderately hard and brittle.

A 3 mil film with 6% diethylene triamine drawn on glass and baked 15 minutes at 150° C. was moderately hard and brittle. A similar film allowed to air dry 67 hours was tack free and very soft.

The amount of linseed acid used in this example was sufficient to esterify only about 60% of the resin to form the monoester, and giving a mixture of unesterified resin and esterified resin.

*Example 26*

2917.2 parts of the same resin as in Example 25 with 82.5 parts of stearic acid and 150 parts of hi-flash naphtha were heated to 400° F. for 15 minutes.

The reaction mixture was cooled and thinned to 50% solids with 63.28% Cellosolve acetate and 36.72% hi-flash naphtha. The reaction product had a weight per epoxide of 10,250, an acid value of 0.51, a weight per gallon of 8.64, a viscosity of $Z_4-Z_5$, and color of 9.

A 3 mil film with 20% of the urea-formaldehyde-catalyst composition above referred to drawn on glass and baked 15 minutes at 150° C. was moderately hard and flexible.

The extent of the esterification in this example was similar to that in the preceding example.

*Example 27*

2803.8 parts of the same resin as in Example 25 with 196.2 parts linseed fatty acids and 150 parts hi-flash naphtha were heated at 460–462° F. for 20 minutes.

The reaction mixture was cooled and thinned to 50% solids with 63.32% Cellosolve acetate and 36.68% hi-flash naphtha. The reaction product had a weight per epoxide of infinity, an acid value of 0.67, a weight per gallon of 8.63, a viscosity of $Z_5$–$Z_6$ and color of 10.

3 mil films with and without 0.01% cobalt drier drawn on glass and baked 15 minutes at 150° C. were moderately hard, tough and flexible. A 3 mil film without drier drawn on glass and allowed to air dry 100 hours was moderately soft and flexible. A 3 mil film with 0.01% cobalt drier drawn on glass and allowed to air dry 91 hours was moderately hard and flexible.

A 3 mil film with 20% of the urea-formaldehyde-catalyst composition above referred to drawn on glass and baked 15 minutes at 150° C. was moderately hard and brittle.

In this example, the amount of acid used was sufficient to esterify all of the resin to give a mixture of esters having an average of around 1.5 ester groups per molecule and the product showed no epoxide groups unreacted. The product in this example represents approximately 5% esterification of the resin, i. e., the resin was reacted with approximately 5% of the amount of acid required for complete esterification of all of the hydroxyls (and epoxide equivalents) of the resin.

*Example 28*

2851.8 parts of the same resin as in Example 5 with 148.2 parts coconut fatty acids and 150 parts hi-flash naphtha were heated at 460° F. for 15 minutes.

The reaction mixture was cooled and thinned to 45% solids with 54.92% Cellosolve acetate and 45.08% hi-flash naphtha. The reaction product had no epoxide value, an acid value of 1.13, a weight per gallon of 8.52, a viscosity of $Z_1$–$Z_2$, and color of 10.

A 3 mil film with 20% of the urea-formaldehyde-catalyst composition above referred to drawn on glass and baked 15 minutes at 150° C. was moderately hard and brittle.

The extent of the esterification in this case is similar to that in the preceding example.

*Example 29*

2857.2 parts of the same resin as in Example 25, with 142.8 parts of lauric acid and 150 parts of hi-flash naphtha were heated at 458–460° F. for 15 minutes.

The reaction mixture was cooled and thinned to 50% solids with 50% Cellosolve acetate and 50% hi-flash naphtha. The reaction product had no epoxide value, an acid value of 0.51, a weight per gallon of 8.60, a viscosity of $Z_5$ and color of 10.

3 mil films with 20% of the urea-formaldehyde-catalyst composition above referred to drawn on glass and baked 15 minutes at 150° C. were moderately hard, tough and flexible.

The extent of the esterification in this case was similar to that of the last two examples.

*Example 30*

2664.3 parts of the same resin of Example 25 with 335.8 parts of dehydrated castor fatty acids and 150 parts of hi-flash naphtha were heated at 460–470° F. for 1 hour and 50 minutes.

The reaction mixture was cooled and thinned to 50% solids with 50% Cellosolve acetate and 50% hi-flash naphtha. The reaction product had no epoxide value, an acid value of 1.05, a weight per gallon of 8.43, a viscosity of $Z_5$–$Z_6$ and color of 9.

3 mil films with and without 0.01% cobalt drier drawn on glass and baked 15 minutes at 150° C. were moderately hard, tough and flexible. Similar films allowed to air dry 91–100 hours were moderately soft and flexible. A 3 mil film with 20% of the urea-formaldehyde-catalyst composition above referred to drawn on glass and baked 15 minutes at 150° C. was moderately hard and brittle.

The amount of fatty acid used in this example was sufficient to esterify all of the resin to the extent of more than 2 ester groups per molecule on the average. But this represents only about 9% esterification of the esterifiable hydroxyls (including epoxide equivalents) of the resin.

*Example 31*

2347.8 parts of the same resin as that in Example 25 with 152.2 parts of 2 ethyl hexoic acid were heated at 452–464° F. for 3 hours and 12 minutes.

The reaction mixture was cooled and thinned to 44.81% solids with 50% Cellosolve acetate and 50% hi-flash naphtha. The reaction product had no epoxide value, an acid value of 2.4, a weight per gallon of 8.47, a viscosity of $Z_3$, and color of 9–10.

3 mil films with 20% of the urea-formaldehyde-composition drawn on glass and baked 15 minutes at 150° C. were moderately hard, tough and flexible.

The extent of the esterification in this case was similar to that of the preceding example.

In the preceding examples the epoxide resin esterified was one made from a dihydric phenol and epichlorhydrin. The following example illustrates the partial esterification of a resin made from a dihydric phenol and a diepoxide, such as described in my Patent No. 2,592,560.

*Example 32*

A mixture of 39 parts of diglycid ether and 45.6 parts of bisphenol were heated, with agitation, at 190 to 215° C. for 1½ hours to give a product softening at 88° C. To this product was added 25 parts of linseed oil acids and the resulting mixture was heated at 225° C. with stirring until the acid value was 5. This product dissolved in lacquer solvents gave an excellent fast drying finish.

In this example the amount of acid used is only sufficient to give an average of 0.9 ester groups per molecule, and is insufficient to convert all of the resin into a monoester.

Example 32 illustrates the production of a partial ester from an epoxide resin made from a dihydric phenol and diepoxide. Other complex epoxide resins can be similarly made by direct addition of polyhydric phenols and polyepoxides, as described in my Patent No. 2,592,560, and such resins can be partially esterified in a similar manner to give epoxide resin esters which contain both epoxide and ester groups, and made up largely of monoesters of epoxide resins, or mixtures of mono and diesters of epoxide resins, or mixtures of monoesters and unesterified epoxide resins.

Instead of using the particular fatty acids as in the above examples, other fatty acids, including drying oil acids and semi-drying and non-drying saturated fatty acids can be used.

The use of the partial esters in combination with resins for paint manufacture is illustrated by the following examples. In these examples, the partial ester used was similar to that referred to in Example 19 and was made by adding to 100 parts of the freshly prepared molten resin at 390° F. 11 parts of linseed fatty acids, with heating of the mixture at 500° F. for 30 minutes, followed by pouring the ester into metal pans to cool. The resulting partial ester was a hard, brittle product melting at 112° C. with an acid number of 1.5 and epoxide value of 7700. A 50% solution in a solvent made up of one-third hi-flash naphtha, one-third Cellosolve acetate, and one-third secondary butyl alcohol had a viscosity of Z and color of 12.

*Example 33*

A gray metal primer was made with the use of the above ester, as follows:

A pigment paste was made by grinding in a mill a mixture of 70 parts of rutile titanium dioxide and 16 parts of a 50% solution of a butylated melamine formaldehyde resin (Uformite MM–55, Rohm & Haas) in a solvent made up of 80% butanol and 20% xylene; and this paste was thinned by the addition of 14 parts of the 50% solution of the resin above referred to.

To 11.2 parts of the above paste, there was added 6 parts of the 50% solution of the same resin (Uformite MM–55) and 53.86 parts of the 50% solution of the partial ester above referred to, together with 6 parts of Cellosolve acetate, 122.6 parts of hi-flash naphtha, and 0.1 part of a flat painting paste (lamp black ground in butylated urea formaldehyde resin).

This mixture gives a paint containing 40% solids, of which 8% is pigment and 32% vehicle. This paint is further admixed with 1 part of hi-flash naphtha and 1 part of Cellosolve acetate for 4 parts of the paint and is suitable for use, e. g. as a dip coat for metal priming. A 2 mil dry film was baked for 30 minutes at 300° F., giving a priming coating of excellent water resistance, alkali resistance, and resistance to detergents, and with excellent adhesion and flexibility.

*Example 34*

The same partial ester was used in making enamel by compounding with resins as follows:

62.5 parts of rutile titanium dioxide, 25 parts of the butylated melamine formaldehyde resin referred to in the preceding example (Uformite MM–55) and 11 parts of hi-flash naphtha was ground in a pebble mill, and there was then added 1.5 parts of hi-flash naphtha to aid in flushing out the mill.

A paint was made by admixing 12.8 parts of the above paste, 6.22 parts of the 50% resin solution (Uformite MM–55), 67.5 parts of a 40% solids solution of the partial ester in a solvent made up of one-third hi-flash naphtha, one-third Cellosolve acetate and one-third secondary butyl alcohol, then adding 12.52 parts of hi-flash naphtha and .8 part of a lamp black tinting paste. The resulting paint had a hardness of 4.8, a weight per gallon of 8.56 and contained 40% non-volatile solids made up of 8% pigment and 32% vehicle.

For application, this paint was reduced by adding one part of Cellosolve acetate to 3 parts of paint. The paint is an enamel suitable for metal surfaces without a primer and can be applied by dipping and by baking one hour at 275° F. One or two coats may be used. One important property of the coating is that there is good adhesion between successive coats. The paint not only has excellent adhesion but also is resistant to high humidity conditions and is useful in protecting metal surfaces under very humid conditions.

In a similar manner, other partial esters can be used with urea formaldehyde or urea melamine resins or with phenol formaldehyde resins to form composite paint and enamel compositions.

The partial esters hereinbefore referred to and illustrated by the examples represent a percentage esterification of less than 10% of the amount of fatty acid required for complete esterification of all of the epoxide and hydroxyl groups of the resins. These partial esters may be mixtures of unesterified resin and resin esterified to more than 10%, as in some of the examples; or they may represent esters in which the resin is substantially all esterified to the extent of a monoester with remaining unesterified epoxide groups; or the partial esters may have all of the epoxide groups reacted, in which case the number of unesterified hydroxyl groups will be more than nine times the number of ester groups per molecule, on the average. With such partial and limited esterification, the products partake rather of the nature of modified resins than of highly esterified resins.

I claim:

1. The method of producing epoxy resin esters containing both epoxide and ester groups admixed with unesterified epoxy resins which comprises subjecting epoxide resins, which are polyether derivatives of dihydric phenols having alternating aliphatic groups and aromatic nuclei united through ether oxygen and having terminal epoxide groups, to esterification with an amount of a monobasic carboxylic acid substantially less than half that corresponding to the epoxide groups of the resin and less than 10% of that required for complete esterification of the epoxide and hydroxyl groups of the resin.

2. The method of producing epoxy resin esters containing both epoxide and ester groups admixed with unesterified epoxy resins which comprises subjecting epoxide resins which are glycidyl ethers of dihydric phenols to esterification with an amount of monobasic carboxylic acid substantially less than that corresponding to half of the glycidyl groups of the resin and not greater than 5% of that required for complete esterification of the epoxide and hydroxyl groups of the resin.

3. The method of producing partial esters of epoxy resins admixed with unesterified epoxy resins which comprises subjecting epoxide resins, which are glycidyl ethers of dihydric phenols and which contain both terminal epoxide groups and intermediate alcoholic hydroxyl groups, to esterification with an amount of monobasic carboxylic acid less than 10% of that required for complete esterification of the epoxide and hydroxyl groups of the resin and substantially less than that required to react with half of the epoxy groups of the resin.

4. Partially esterified epoxide resins admixed with unesterified epoxy resins, said resins being polyether derivatives of dihydric phenols having alternating aliphatic groups and aromatic nuclei united through ether oxygen and having terminal epoxide groups, substantially less than half of said resins being partially esterified with a monobasic carboxylic acid at their epoxide groups and having part of their epoxide groups free, to form a mixture consisting essentially of monoesters of epoxy resins having unreacted epoxy groups and a substantial proportion of unesterified epoxy resins, the extent of the esterification being substantially less than 10% of that required for complete esterification of the epoxide and hydroxyl groups of the resin.

5. A composition consisting essentially of a mixture in substantial amounts of unesterified epoxide resins and monoesters of epoxide resins, said epoxide resins being polyether derivatives of dihydric phenols having alternating aliphatic groups and aromatic nuclei united through ether oxygen and having terminal epoxide groups, the monoesters of the epoxide resins being esterified with monobasic fatty acids at not more than half their epoxide groups and the total esterification not being greater than about 5% of that required for complete esterification of the epoxide and hydroxyl groups of the resins.

6. A composition consisting essentially of a mixture of a preponderating amount of unesterified epoxide resins and a smaller amount of monoesters of epoxide resins, said epoxide resins being polyether derivatives of dihydric phenols having alternating aliphatic groups and aromatic nuclei united through ether oxygen and having terminal epoxide groups, the monoesters of the epoxide resins being esterified with monobasic fatty acids at not more than half their epoxide groups and the total esterification not being greater than about 5% of that required for complete esterification of the epoxide and hydroxyl groups of the resins.

References Cited in the file of this patent

UNITED STATES PATENTS

| | | |
|---|---|---|
| 2,456,408 | Greenlee | Dec. 14, 1948 |
| 2,653,141 | Greenlee | Sept. 22, 1953 |
| 2,698,308 | Crecelius | Dec. 28, 1954 |